United States Patent
Zhang et al.

(10) Patent No.: US 10,726,811 B2
(45) Date of Patent: Jul. 28, 2020

(54) ELECTRONIC DEVICES WITH DISPLAYS

(71) Applicant: Apple Inc., Cupertino, CA (US)

(72) Inventors: Sheng Zhang, Milpitas, CA (US);
Bennett S. Wilburn, San Jose, CA (US); Paolo Sacchetto, Cupertino, CA (US); Chaohao Wang, Sunnyvale, CA (US); Cheng Chen, San Jose, CA (US); Enkhamgalan Dorjgotov, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/326,665

(22) PCT Filed: Aug. 14, 2017

(86) PCT No.: PCT/US2017/046820
§ 371 (c)(1),
(2) Date: Feb. 19, 2019

(87) PCT Pub. No.: WO2018/044544
PCT Pub. Date: Mar. 8, 2018

(65) Prior Publication Data
US 2019/0189086 A1 Jun. 20, 2019

Related U.S. Application Data

(60) Provisional application No. 62/382,571, filed on Sep. 1, 2016.

(51) Int. Cl.
*G09G 5/36* (2006.01)
*G06F 3/147* (2006.01)
(Continued)

(52) U.S. Cl.
CPC ............ *G09G 5/363* (2013.01); *G06F 3/147* (2013.01); *G09G 3/3225* (2013.01); *G09G 5/10* (2013.01);
(Continued)

(58) Field of Classification Search
CPC combination set(s) only.
See application file for complete search history.

(56) References Cited

U.S. PATENT DOCUMENTS

2014/0092150 A1* 4/2014 Slavenburg ............ G09G 5/001
345/698
2018/0047332 A1* 2/2018 Kuwahara ............... G06F 3/147

* cited by examiner

*Primary Examiner* — Deeprose Subedi
(74) *Attorney, Agent, or Firm* — Treyz Law Group, P.C.; Joseph F. Guihan

(57) ABSTRACT

An electronic device may have a display such as an organic light-emitting diode display. Electronic devices may also include a number of sensors such as accelerometers and gaze detection sensors. A graphics processing unit (GPU) may render digital pixel values for pixels in the device display. Frames (F2) with long rendering times may cause latency. To reduce latency, an image frame may be displayed for an extended period of time (68) to wait for the subsequent frame (F2) to finish rendering. Once the subsequent image frame (F2) has finished rendering, the subsequent image frame may be displayed without delay. To increase the lifespan of the display, variable persistence may be used. Sensor data and other factors may be used to dynamically determine persistence for minimal motion blur and maximum display lifespan. Sensor data may also be used to determine refresh rates for different portions of the display.

7 Claims, 14 Drawing Sheets

(51) Int. Cl.
    *G09G 5/10* (2006.01)
    *G09G 3/3225* (2016.01)
(52) U.S. Cl.
    CPC . *G09G 2310/08* (2013.01); *G09G 2320/0261* (2013.01); *G09G 2320/043* (2013.01); *G09G 2320/064* (2013.01); *G09G 2320/0633* (2013.01); *G09G 2330/021* (2013.01); *G09G 2340/0435* (2013.01); *G09G 2354/00* (2013.01)

ELECTRONIC DEVICES WITH DISPLAYS

This patent application claims priority to U.S. provisional patent application No. 62/382,571, filed on Sep. 1, 2016 which is hereby incorporated by reference herein in its entirety.

BACKGROUND

This relates generally to electronic devices, and, more particularly, to electronic devices with displays.

Electronic devices often include displays. For example, an electronic device may have an organic light-emitting diode display based on organic-light-emitting diode pixels or a liquid crystal display based on liquid crystal pixels.

It can be challenging to design devices such as these. If care is not taken, the user may experience excessive latency while operating the device. Additionally, the user may experience motion blur when viewing the display.

It would therefore be desirable to be able to provide improved displays for electronic devices.

SUMMARY

An electronic device may have a display such as an organic light-emitting diode display. Electronic devices may also include a number of sensors such as accelerometers and gaze detection sensors.

An electronic device may include a graphics processing unit (GPU) that renders digital pixel values for pixels in the device display. Some image frames may have longer rendering periods than others due to certain characteristics of the scene being depicted. Frames with long rendering times may cause latency.

To reduce latency, an image frame may be displayed for an extended period of time to wait for the subsequent frame to finish rendering. Once the subsequent image frame has finished rendering, the subsequent image frame may be displayed without delay. The image frames may be rendered based on the user's head position at the beginning of the rendering period or based on the user's predicted head position at the end of the rendering period.

In addition to latency, power consumption and display lifespan are other issues faced by displays in head-mounted devices. To increase the lifespan of the display, variable persistence may be used. Using a high persistence may increase the lifespan of the display but make the display more susceptible to motion blur. Sensor data and other factors may be used to dynamically determine persistence for minimal motion blur and maximum display lifespan. Sensor data may also be used to determine refresh rates for different portions of the display. This may decrease the power consumption of the display.

DETAILED DESCRIPTION

Figure 1:
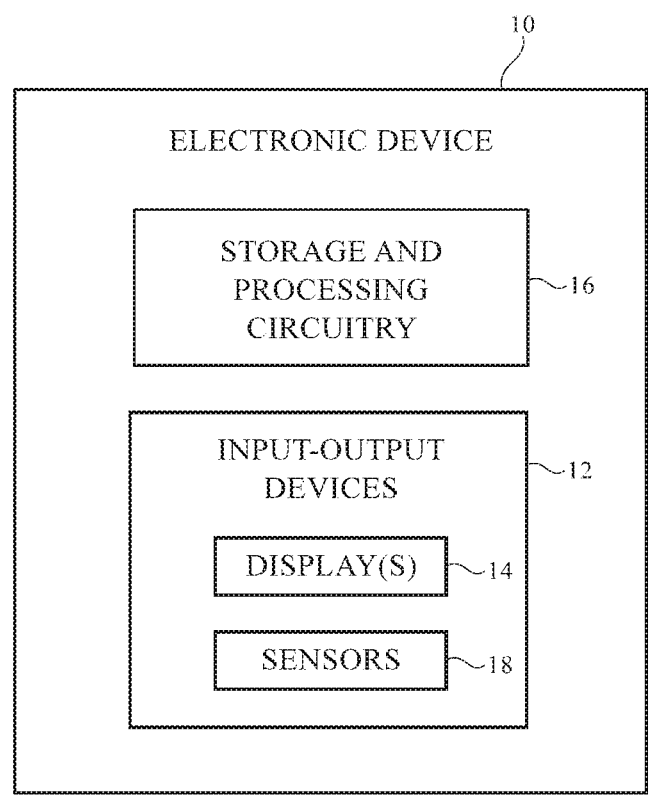
FIG. 1 is a schematic diagram of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, electronic device 10 may include storage and processing circuitry 16 for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access memory), etc. Processing circuitry in storage and processing circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Input-output devices 12 may also include one or more sensors 18. Electronic device 10 may include a variety of different sensors. Sensors such as an accelerometer, a compass, an ambient light sensor or other light detector, a proximity sensor, a scanning laser system, an image sensor, an environmental sensor, and/or other sensors may be used in gathering input during operation of electronic device 10. If desired, electronic device 10 may be a head-mounted device and an image sensor in the electronic device may be used for gaze detection. An image sensor used for gaze detection may sometimes be referred to as a gaze detection sensor. During operation of electronic device 10, data from sensors 18 may be used to control display 14.

Storage and processing circuitry 16 may be used to run software on device 10 such as operating system code and applications. During operation of device 10, the software running on storage and processing circuitry 16 may display images on display 14.

Figure 2:
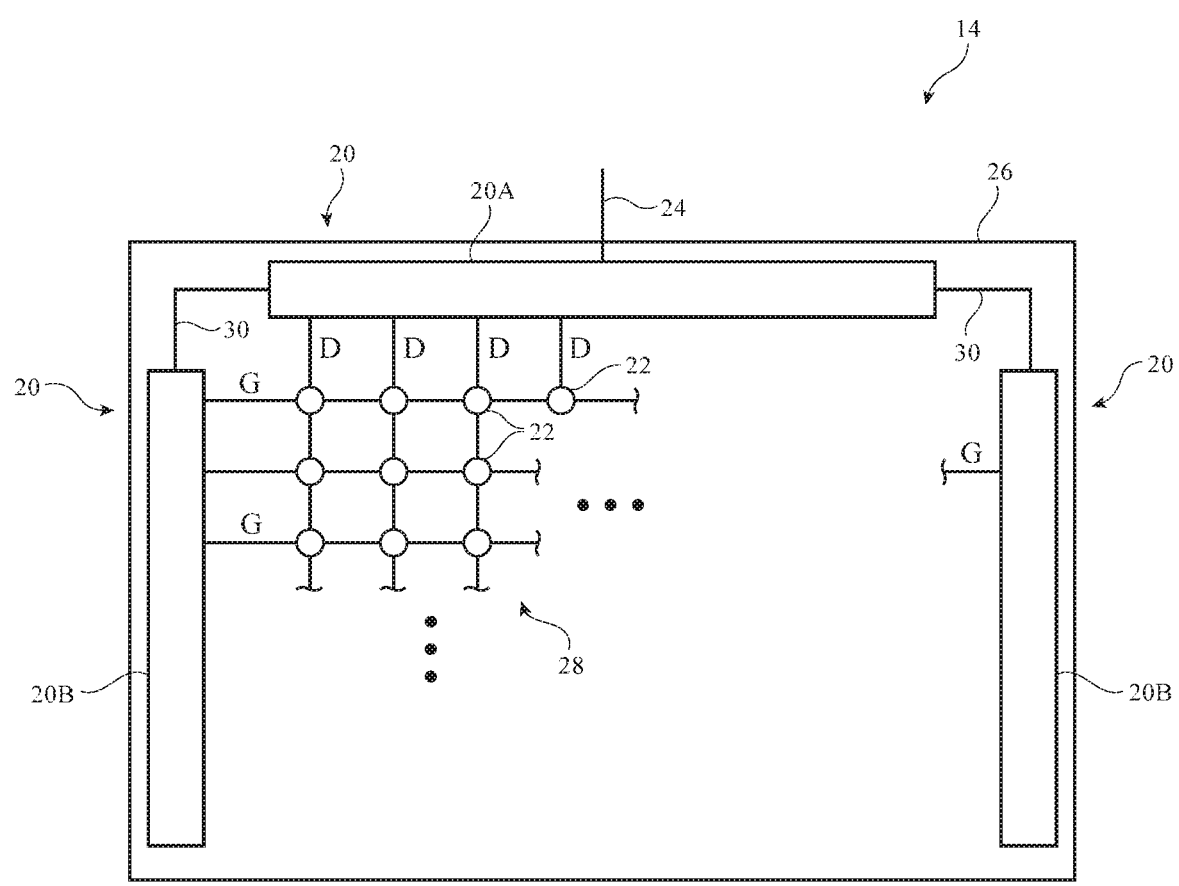
FIG. 2 is a schematic diagram of an illustrative display in accordance with an embodiment.

FIG. 2 is a diagram of an illustrative display. As shown in FIG. 2, display 14 may include layers such as substrate layer 26. Substrate layers such as layer 26 may be formed from rectangular planar layers of material or layers of material with other shapes (e.g., circular shapes or other shapes with one or more curved and/or straight edges). The substrate layers of display 14 may include glass layers, polymer layers, composite films that include polymer and inorganic materials, metallic foils, etc.

Display 14 may have an array of pixels 22 for displaying images for a user such as pixel array 28. Pixels 22 in array 28 may be arranged in rows and columns. The edges of array 28 may be straight or curved (i.e., each row of pixels 22 and/or each column of pixels 22 in array 28 may have the same length or may have a different length). There may be any suitable number of rows and columns in array 28 (e.g., ten or more, one hundred or more, or one thousand or more, etc.). Display 14 may include pixels 22 of different colors. As an example, display 14 may include red pixels, green pixels, and blue pixels. If desired, a backlight unit may provide backlight illumination for display 14.

Display driver circuitry 20 may be used to control the operation of pixels 28. Display driver circuitry 20 may be formed from integrated circuits, thin-film transistor circuits, and/or other suitable circuitry. Illustrative display driver circuitry 20 of FIG. 2 includes display driver circuitry 20A and additional display driver circuitry such as gate driver circuitry 20B. Gate driver circuitry 20B may be formed along one or more edges of display 14. For example, gate driver circuitry 20B may be arranged along the left and right sides of display 14 as shown in FIG. 2.

As shown in FIG. 2, display driver circuitry 20A (e.g., one or more display driver integrated circuits, thin-film transistor circuitry, etc.) may contain communications circuitry for communicating with system control circuitry over signal path 24. Path 24 may be formed from traces on a flexible printed circuit or other cable. The control circuitry may be located on one or more printed circuits in electronic device 10. During operation, control circuitry (e.g., storage and processing circuitry 16 of FIG. 1) may supply circuitry such as a display driver integrated circuit in circuitry 20 with image data for images to be displayed on display 14. Display driver circuitry 20A of FIG. 2 is located at the top of display 14. This is merely illustrative. Display driver circuitry 20A may be located at both the top and bottom of display 14 or in other portions of device 10.

To display the images on pixels 22, display driver circuitry 20A may supply corresponding image data to data lines D while issuing control signals to supporting display driver circuitry such as gate driver circuitry 20B over signal paths 30. With the illustrative arrangement of FIG. 2, data lines D run vertically through display 14 and are associated with respective columns of pixels 22.

Gate driver circuitry 20B (sometimes referred to as gate line driver circuitry or horizontal control signal circuitry) may be implemented using one or more integrated circuits and/or may be implemented using thin-film transistor circuitry on substrate 26. Horizontal control lines G (sometimes referred to as gate lines, scan lines, emission control lines, etc.) run horizontally through display 14. Each gate line G is associated with a respective row of pixels 22. If desired, there may be multiple horizontal control lines such as gate lines G associated with each row of pixels. Individually controlled and/or global signal paths in display 14 may also be used to distribute other signals (e.g., power supply signals, etc.).

Gate driver circuitry 20B may assert control signals on the gate lines G in display 14. For example, gate driver circuitry 20B may receive clock signals and other control signals from circuitry 20A on paths 30 and may, in response to the received signals, assert a gate line signal on gate lines G in sequence, starting with the gate line signal G in the first row of pixels 22 in array 28. As each gate line is asserted, data from data lines D may be loaded into a corresponding row of pixels. In this way, control circuitry such as display driver circuitry 20A and 20B may provide pixels 22 with signals that direct pixels 22 to display a desired image on display 14. Each pixel 22 may have a light-emitting diode and circuitry (e.g., thin-film circuitry on substrate 26) that responds to the control and data signals from display driver circuitry 20.

Figure 3:
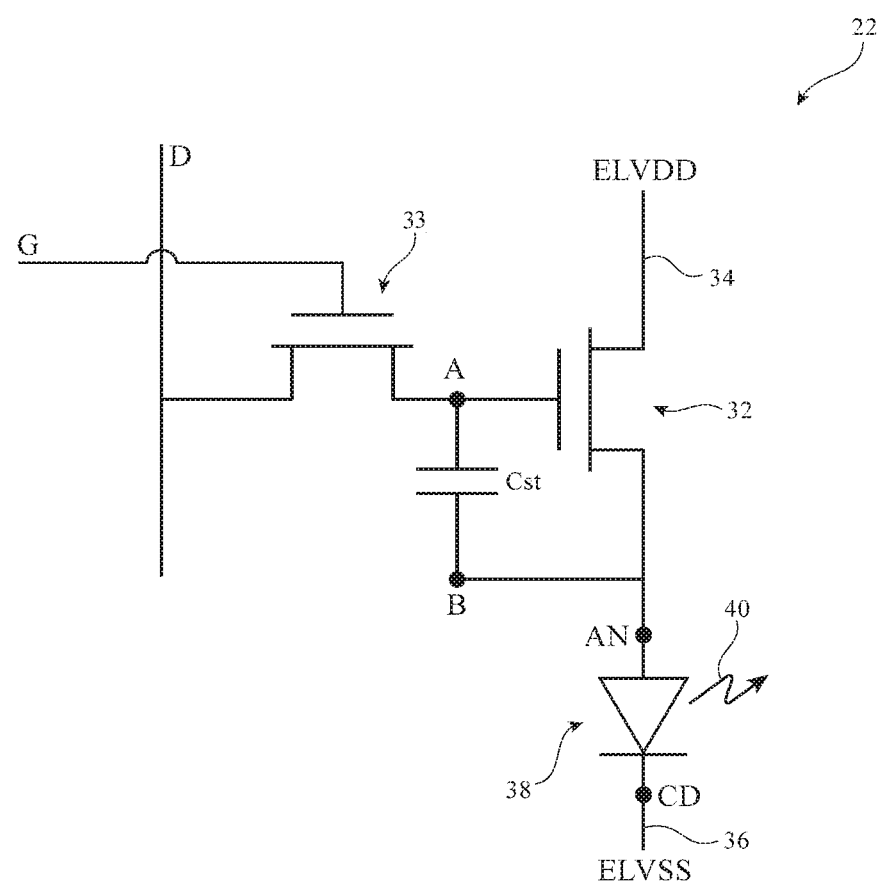
FIG. 3 is a diagram of an illustrative pixel circuit in accordance with an embodiment.

A schematic diagram of an illustrative pixel circuit of the type that may be used for each pixel 22 in array 28 is shown in FIG. 3. As shown in FIG. 3, display pixel 22 may include light-emitting diode 38. A positive power supply voltage ELVDD may be supplied to positive power supply terminal 34 and a ground power supply voltage ELVSS may be supplied to ground power supply terminal 36. Diode 38 has an anode (terminal AN) and a cathode (terminal CD). The state of drive transistor 32 controls the amount of current flowing through diode 38 and therefore the amount of emitted light 40 from display pixel 22. Cathode CD of diode 38 is coupled to ground terminal 36, so cathode terminal CD of diode 38 may sometimes be referred to as the ground terminal for diode 38.

To ensure that transistor 32 is held in a desired state between successive frames of data, display pixel 22 may include a storage capacitor such as storage capacitor Cst. The voltage on storage capacitor Cst is applied to the gate of transistor 32 at node A to control transistor 32. Data can be loaded into storage capacitor Cst using one or more switching transistors such as switching transistor 33. When switching transistor 33 is off, data line D is isolated from storage capacitor Cst and the gate voltage on terminal A is equal to the data value stored in storage capacitor Cst (i.e., the data value from the previous frame of display data being displayed on display 14). When gate line G (sometimes referred to as a scan line) in the row associated with display pixel 22 is asserted, switching transistor 33 will be turned on and a new data signal on data line D will be loaded into storage capacitor Cst. The new signal on capacitor Cst is applied to the gate of transistor 32 at node A, thereby adjusting the state of transistor 32 and adjusting the corresponding amount of light 40 that is emitted by light-emitting diode 38. If desired, the circuitry for controlling the operation of light-emitting diodes for display pixels in display 14 (e.g., transistors, capacitors, etc. in display pixel circuits such as the display pixel circuit of FIG. 3) may be formed using other configurations (e.g., configurations that include circuitry for compensating for threshold voltage variations in drive transistor 32, etc.). The display pixel circuit of FIG. 3 is merely illustrative. Additionally, the example in FIG. 3 of pixel 22 being a light-emitting diode pixel is merely illustrative. If desired, display 14 of electronic device 10 may have liquid crystal pixels or any other desired type of pixels.

Figure 4:
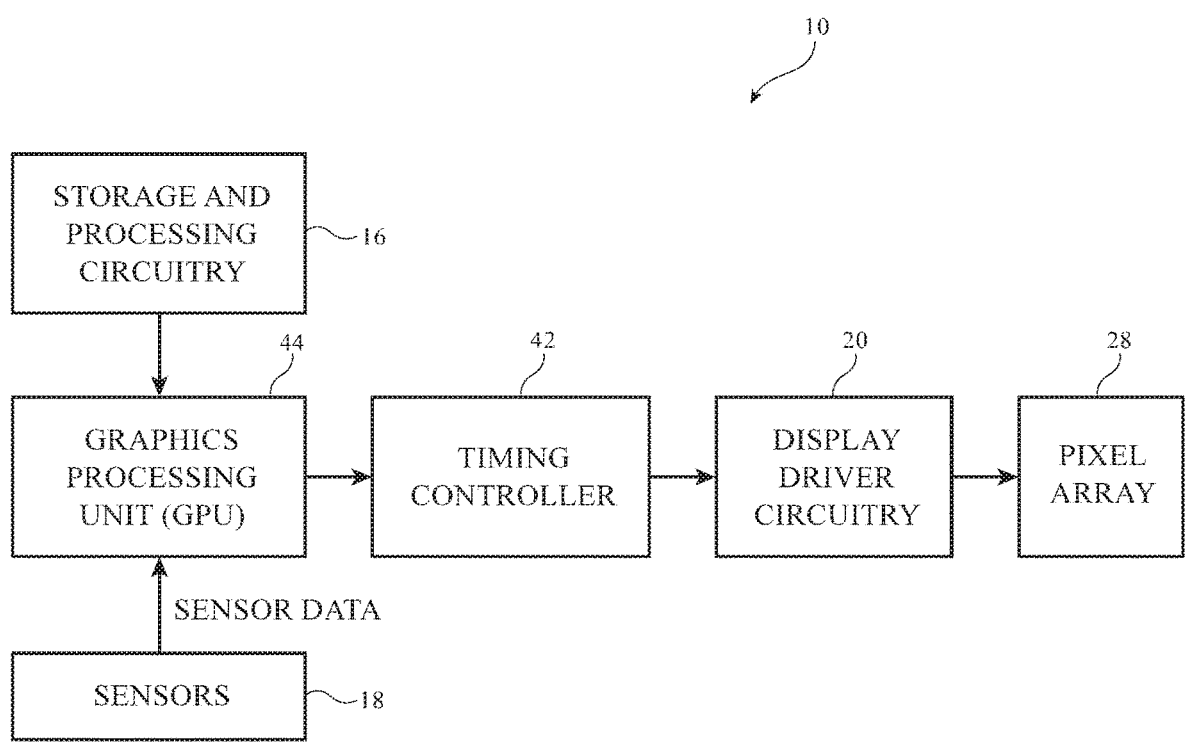
FIG. 4 is a schematic diagram of components in an electronic device that may be used to operate a pixel array in accordance with an embodiment.

FIG. 4 is a schematic diagram of various components within electronic device 10 that are used to control pixel array 28 of display 14. During operation of device 10, storage and processing circuitry 16 may produce data that is to be displayed on display 14. This display data may be provided to control circuitry such as timing controller integrated circuit 42 using graphics processing unit (GPU) 44. Storage and processing circuitry 16, graphics processing unit 44, and timing controller 42 may sometimes collectively be referred to herein as control circuitry. Storage and processing circuitry 16, graphics processing unit 44, and timing controller 42 may be used in controlling the operation of display 14. As shown, graphics processing unit 44 may receive input from storage and processing circuitry 16 and sensors 18. Graphics processing unit 44 may render digital pixel values that will ultimately be supplied to pixels 22 to display a desired image. Graphics processing unit 44 may output pixel data to display driver circuitry 20 through timing controller 42. Timing controller 42 may provide digital display data to display driver circuitry 20. Display driver circuitry 20 may receive the digital display data from timing controller 42 and use digital-to-analog converter circuitry within display driver circuitry 20 to provide corresponding analog output signals to pixels 22 in pixel array 28.

As mentioned previously, display 14 may be incorporated into a head-mounted device. Accordingly, the images displayed on display 14 may be dependent on the head position of the user of the head-mounted device in order to create an augmented reality (AR) or virtual reality (VR) environment for the user. When using display 14 in this type of environment, avoiding latency is extremely important. Latency may be defined as the time interval between a stimulation and a response. In a head-mounted virtual reality device, for example, latency may occur if there is a delay between a user moving their head and the displayed scene reacting to the head movement.

Figure 5:
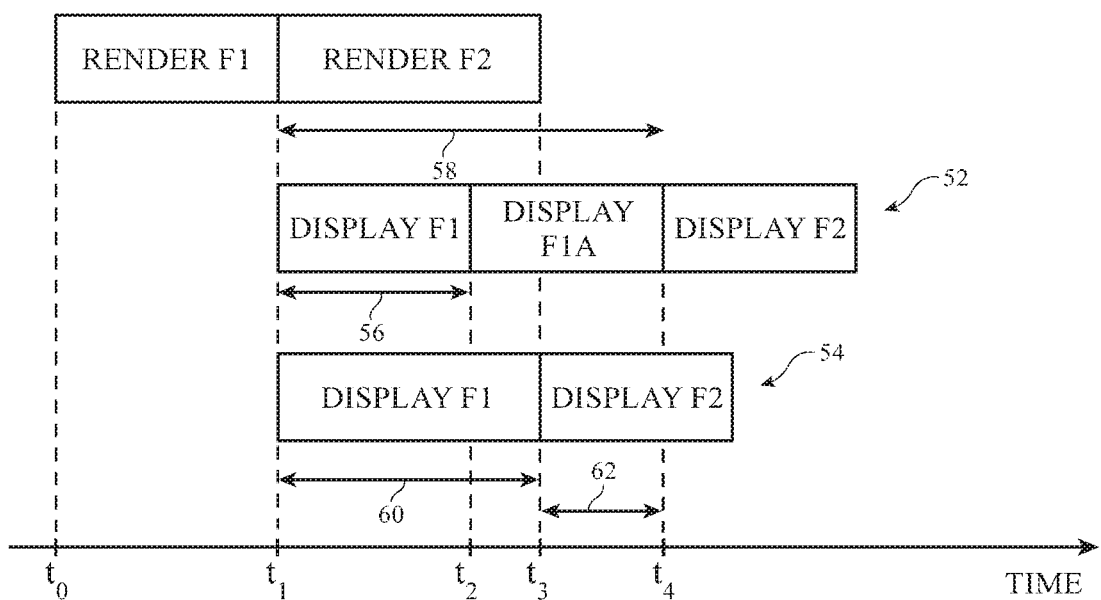
FIG. 5 is a timing diagram showing illustrative methods for rendering and displaying image frames on a display when an image frame has a long rendering time in accordance with an embodiment.

FIG. 5 is an illustrative timing diagram showing the rendering and displaying of image frames in a display. One example in which latency can occur is if a frame takes a long time to render. A long rendering time may result when a scene with lots of objects or complex lighting is being rendered. As shown in FIG. 5, a first frame (F1) may begin rendering at $t_0$. When rendering of the first frame is complete, the frame may be displayed at $t_1$. In normal operation, F1 may be scheduled to be displayed for a given amount of time, sometimes referred to as a frame duration (e.g., approximately 8 ms in a 120 Hz display). Therefore, the display time for F1 should conclude at $t_2$ (after the standard frame duration has elapsed). Ideally, the subsequent frame (F2) would be rendered and ready to display at $t_2$. However, in some cases F2 may not have completed rendering at $t_2$. In these situations, there are multiple ways to operate the display. Some displays may have a fixed presentation time for each frame, meaning that every frame must be displayed for the same frame duration. Displays with fixed presentation times may use method 52 in FIG. 5 when a long rendering period occurs. In particular, at $t_2$ when the standard frame duration for F1 has concluded but it is determined that F2 is not yet rendered, the first frame may be displayed again as F1A. F1A may be displayed from $t_2$ until $t_4$ (i.e., the standard frame duration). F2 may finish rendering at $t_3$ between $t_2$ and $t_4$. Accordingly, at $t_4$ when the display time for F1A is over, F2 may be displayed. This method may result in F2 being displayed at $t_4$, while F2 began rendering at $t_1$. There is therefore a delay 58 between the start of rendering F2 and the display of F2.

Instead of using a fixed presentation time (as in method 52), displays may instead use an arbitrary presentation time. Method 54 in FIG. 5 shows using an arbitrary presentation time scheme to handle an extended rendering period for a frame. Similar to method 54, F1 may be displayed at $t_1$. At $t_2$, it is determined that F2 has not finished rendering. However, instead of displaying F1 again for standard frame duration 56 (as in method 52), the display may extend the original display time of F1 until F2 has finished rendering. At $t_3$, when F2 has finished rendering, F2 may be displayed. This method may result in F2 being displayed at $t_3$, while F2 began rendering at $t_1$. There is therefore a delay 60 between the start of rendering F2 and display of F2. Comparing method 54 to method 52 shows that F2 is displayed at $t_3$ for method 54 while F2 is displayed at t$_4$ for method 52. Therefore, the duration of time 62 between t$_3$ and t$_4$ is a latency reduction for the display when method 54 is used instead of method 52.

In method 54, F1 may be displayed until rendering of F2 is complete. It should be noted, however, that continuously displaying F1 for too long of a time period may not be desirable. Accordingly, at t$_2$, the expected render completion time for F2 may be determined. If the expected render completion time is longer than a time threshold, F1 may be displayed again similar to as described in connection with method 52. For example, the threshold may be approximately 2 ms. In this example, F1 will be extended for as long as 2 ms to wait for F2 to finish rendering. However, if F1 needs to be extended for more than 2 ms, F1 will be displayed again as F1A for the standard duration of time. The threshold for determining whether or not to extend F1 may be a fixed threshold (i.e., a threshold that does not change) or a variable threshold (i.e., a threshold that is dynamically chosen based on sensor data and other data from the electronic device). The threshold may be any desired length of time (e.g., less than 2 ms, between 1 and 3 ms, less than 5 ms, less than 3 ms, greater than 1 ms, etc.).

In FIG. 5, each frame of image data may be rendered based on a user's head position at the beginning of the rendering period. In other words, sensor data at t$_0$ may be used to determine what data to render for F1. Similarly, sensor data at t$_1$ may be used to determine what data to render for F2. However, a user may be moving their head during the rendering period of each frame. If this occurs, the displayed frame may not align with the user's head position as desired. In certain circumstances, this problem may be mitigated using "time warp" techniques. To illustrate this concept, consider again the method 52 shown in FIG. 5. As previously mentioned, F1 may be rendered based upon user head position at t$_0$. At t$_1$, just as F1 is about to be displayed, the head position of the user may again be assessed. If it is determined that the head position has not changed significantly between t$_0$ and t$_1$, F1 may be displayed without modification. However, if the head position of the user has changed significantly between t$_0$ and t$_1$, the frame may be shifted to help account for the change in head position. Because the rendering of F1 is almost complete, significant changes to the image frame cannot be made. However, the frame can be shifted relative to the user's eyes to make up for the change in head position.

F1, F1A, and F2 of method 52 may all independently be time warped. For example, at t$_1$ the head position of the user may not necessitate a time warp. However, at t$_2$, when F1 is being displayed for the second time, the sensors may indicate that the head position at t$_2$ is different compared to the head position at t$_0$ and a time warp may occur. In another example, the head position at t$_1$ may necessitate a time warp for F1. The head position at t$_2$ may then necessitate an additional time warp for F1A.

Figure 6:
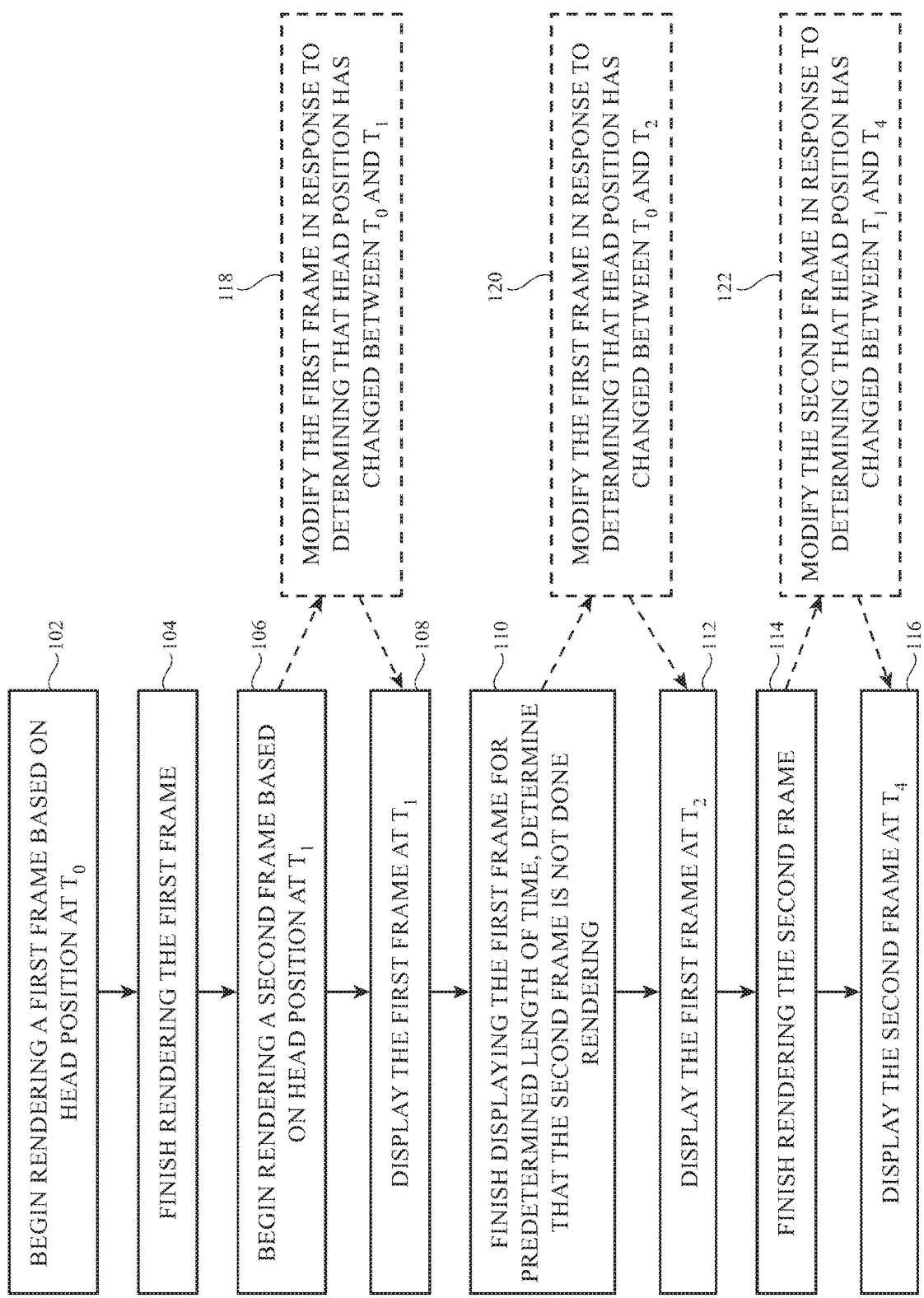
FIG. 6 is a flowchart of illustrative method steps for rendering and displaying image frames with a fixed presentation time in accordance with an embodiment.

FIG. 6 shows illustrative method steps for rendering and displaying image frames in a display. These method steps correspond to the fixed presentation time method 52 shown in FIG. 5. As shown in FIG. 6, at step 102 a GPU (such as GPU 44) may begin rendering a first frame based on the head position of the user at t$_0$. At step 104, rendering of the first frame may be completed. Next, at step 106, the GPU may begin rendering a second frame based on the user's head position at t$_1$. The first frame may also be displayed at t$_1$, as shown in step 108. At step 110 after a predetermined length of time (corresponding to the standard frame duration), the display may finish displaying the first frame. Also at step 110, it may be determined that the second frame is not done rendering. In response, the first frame may be displayed again at t$_2$ in step 112. At step 112, the first frame may be displayed for the same predetermined length of time as the first frame was displayed at step 108. At step 114, the GPU may finish rendering the second frame. However, there may be a delay until the second frame is displayed at t$_4$ during step 116. This method of displaying image frames using a fixed presentation time may result in latency in the display system.

Before each frame is displayed, an optional time warp may be performed on the image frame. As discussed in connection with FIG. 5, an image frame may be modified if the position of the user's head has changed between the time the frame began rendering and the time the frame is displayed. As shown in FIG. 6, optional time warp steps 118, 120, and 122 may be performed. At step 118, it may be determined that the head position of the user has changed between t0 (the start of the first frame rendering period) and t$_1$ (the time the first frame is displayed). The first frame may be modified depending on the detected change in user head position. Similarly, at step 120, it may be determined that the head position of the user has changed between t0 (the start of the first frame rendering period) and t$_2$ (the time the first frame is displayed for the second time). The first frame may be modified based on the detected change in head position between t$_0$ and t$_2$. Finally, at step 122, it may be determined that the head position of the user has changed between t$_1$ (the start of the second frame rendering period) and t$_4$ (the time the second frame is displayed). The second frame may be modified based on the detected change in head position between t$_1$ and t$_4$.

Figure 7:
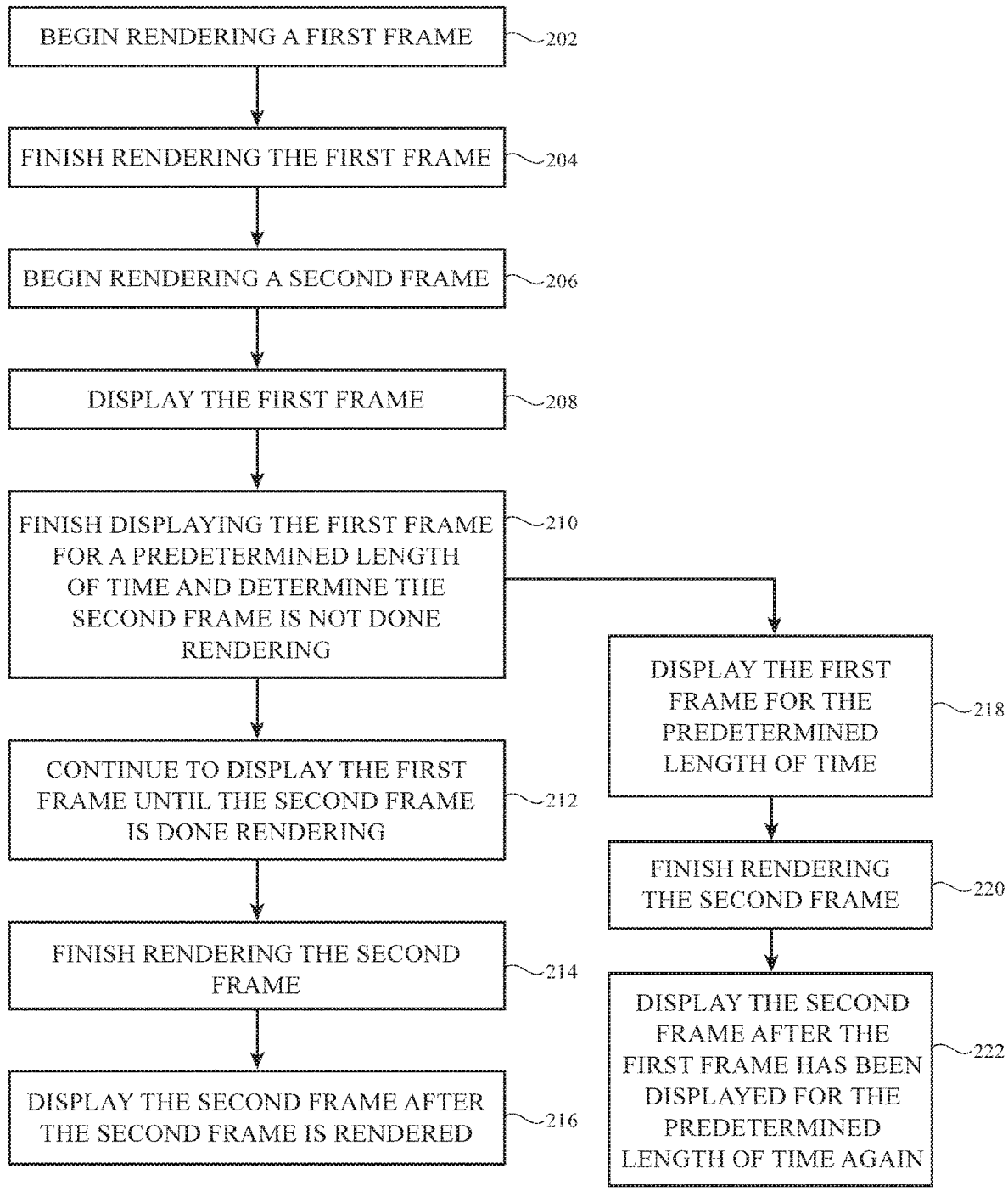
FIG. 7 is a flowchart of illustrative method steps for rendering and displaying image frames with an arbitrary presentation time in accordance with an embodiment.

FIG. 7 shows illustrative method steps for rendering and displaying image frames using arbitrary presentation time. These steps correspond to method 54 in FIG. 5. As shown in FIG. 7, at step 202 a GPU (such as GPU 44) may begin rendering a first frame. The first frame may be rendered based on head position of the user at t$_0$, for example. At step 204, rendering of the first frame may be completed. Next, at step 206, the GPU may begin rendering a second frame. The second frame may be rendered based on the user's head position at t$_2$, for example. At step 208, the first frame may also be displayed. The first frame may be displayed at t$_1$ if desired. At step 210, the display may finish displaying the first frame for the predetermined length of time (i.e., the standard frame duration). Also at step 210, it may be determined that the second frame is not done rendering.

In response to determining that the second frame is not done rendering, the expected time remaining in the rendering process may be determined. If the time remaining is less than a threshold, the method may proceed to step 212. If the time remaining is greater than the threshold, the method may proceed to step 218 and display the first frame for the predetermined length of time again (similar to as discussed in connection with FIG. 6). At step 220, the GPU may finish rendering the second frame. However, there may be a delay (e.g., until t$_4$ in FIG. 5) until the second frame is displayed at step 222. If the time remaining in the rendering process is less than the threshold and the method proceeds to step 212, the first frame may continue to be displayed until the second frame is done rendering. The second frame may then finish rendering at step 214. At step 216, after the second frame is done rendering, the second frame may be displayed.

Although not explicitly shown in FIG. 7, optional time warps may be performed each time a frame is displayed in FIG. 7. For example, at steps 208, 216, 218, and 222, a time warp may optionally be performed. In each case, the given frame may be modified if it is determined that the head position at the time the given frame began rendering is different from the head position at the time the given frame is displayed.

The temporal relationships shown in the flowcharts of FIGS. 6, 7, 9, 13, 15, and 16 are merely illustrative. It can be understood that some of the steps in the flowcharts may be reordered or performed simultaneously. For example, the order of steps 206 and 208 in FIG. 7 is merely illustrative. If desired, step 208 may be performed before step 206, or steps 206 and 208 may be performed simultaneously.

Figure 8:
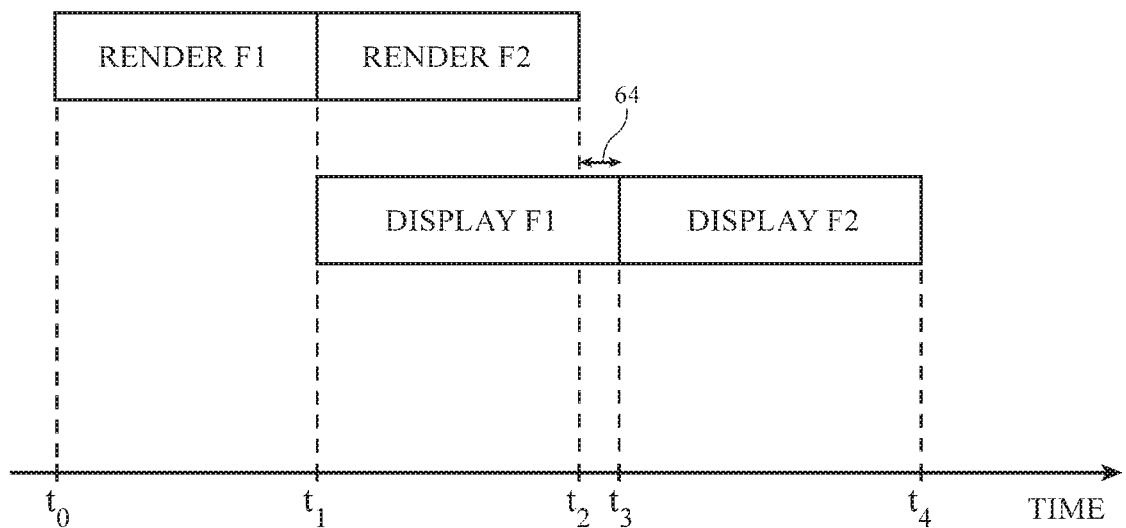
FIG. 8 is a timing diagram showing illustrative methods for rendering and displaying image frames on a display when an image frame has a short rendering time in accordance with an embodiment.

FIG. 8 is an illustrative diagram showing how the display may handle frames that render quicker than expected. As shown in FIG. 8, a first frame (F1) may begin rendering at $t_0$. When rendering of the first frame is complete, the frame may be displayed at $t_1$. A second frame (F2) may also begin rendering at $t_1$. However, F2 may render faster than expected and complete rendering at $t_2$. In certain embodiments, F2 may be displayed as soon as rendering of F2 is complete. However, if F2 renders quickly this may lead to F2 being displayed early. To avoid this, each frame may be rendered with a time stamp. The time stamp may mark the expected display time for each frame. For example, F1 may have a time stamp of $t_1$, and F2 may have a time stamp of $t_3$. Therefore, even if F2 finishes rendering at $t_2$ as shown in FIG. 8, the display will wait a duration of time 64 until $t_3$ before displaying F2. This may ensure that frames are not displayed earlier than desired.

Figure 9:
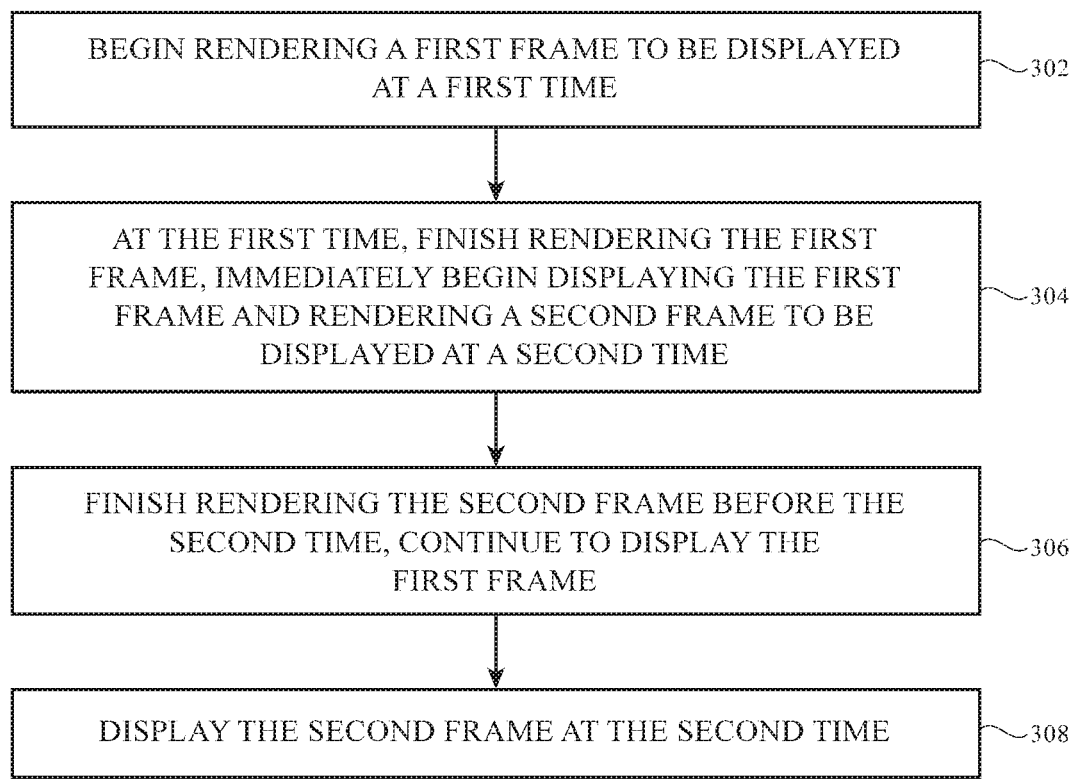
FIG. 9 is a flowchart of illustrative method steps for rendering and displaying image frames using time stamps in accordance with an embodiment.

FIG. 9 shows illustrative method steps for rendering and displaying image frames using time stamps as shown in FIG. 8. At step 302, a GPU (e.g., GPU 44) may begin rendering a first frame. The first frame may be time stamped to be displayed at a first time. At step 304 the GPU may finish rendering the first frame at the first time. The first frame may then be displayed at the first time. Also at the first time, the GPU may begin rendering a second frame. The second frame may be time stamped to be displayed at a second time. At step 306, the GPU may finish rendering the second frame before the second time. Instead of displaying the second frame, the first frame may continue to be displayed. Only at the second time in step 308 is the second frame displayed. Time stamping image frames in this way may ensure that frames are not displayed earlier than desired.

Figure 10:
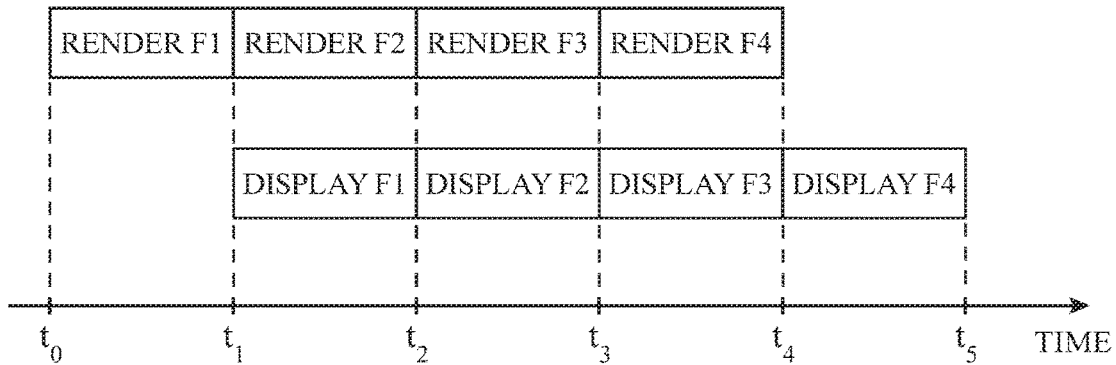
FIG. 10 is a timing diagram showing illustrative methods for rendering and displaying image frames on a display using head position prediction in accordance with an embodiment.
Figure 11:
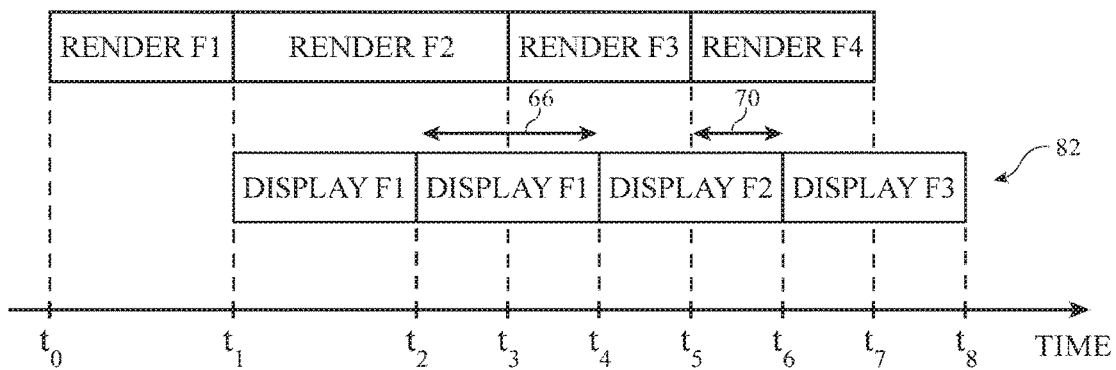
FIG. 11 is a timing diagram showing illustrative method steps for rendering and displaying image frames with a fixed presentation time in a display that uses head position prediction in accordance with an embodiment.
Figure 12:
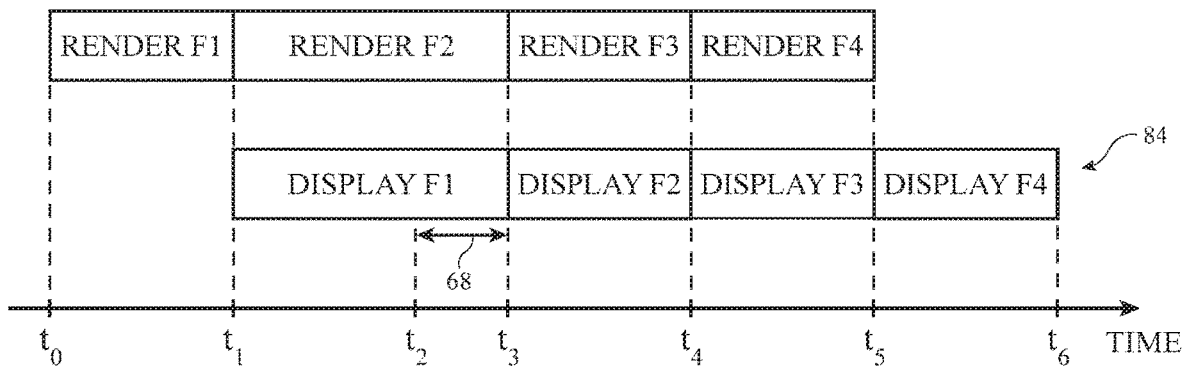
FIG. 12 is a timing diagram showing illustrative method steps for rendering and displaying image frames with an arbitrary presentation time in a display that uses head position prediction in accordance with an embodiment.

As discussed in connection with FIG. 5, image frames may be rendered based on a user's head position at the start of a rendering period. For example, a sensor data sample may be used to determine a user's head position, and an image frame may be rendered based on the determined head position. However, because the frame takes time to render, there will be a delay between the time the frame is displayed and the time the head position of the user was initially assessed. If the user's head position changes during this time period, the image frame may not match the user's head position when the image frame is ultimately displayed. To help alleviate this problem, a frame may be rendered based on a user's predicted head position at the end of the rendering period instead of on the known head position at the beginning of the rendering period. FIGS. 10-12 show different examples of predictive rendering.

FIG. 10 shows an example of rendering frames using motion prediction. Ideally, each frame will finish rendering at or before the time when the previous frame finishes its display time. In FIG. 10, for example, a first frame (F1) may begin rendering at $t_0$. The content of F1 may be determined based on the predicted head position at $t_1$. At $t_0$, sensor data such as accelerometer data may be used to predict the head position of the user at $t_1$. F1 may then be rendered based on the predicted head position at $t_1$. At $t_1$, after F1 is finished rendering, F1 may be displayed. Also at $t_1$, a second frame (F2) may be rendered based on the predicted head position at $t_2$. This process may continue for each subsequent frame. For example, at $t_2$, after F2 is finished rendering, F2 may be displayed. Also at $t_2$, a third frame (F3) may be rendered based on the predicted head position at $t_3$. At $t_3$, after F3 is finished rendering, F3 may be displayed. Also at $t_3$, a fourth frame (F4) may be rendered based on the predicted head position at $t_4$. The fourth frame may then be displayed from $t_4$ to $t_5$.

FIG. 10 shows an ideal scenario where each frame finishes rendering before the end of the standard frame duration of the previous frame. However, sometimes frames have a rendering time that is longer than the standard frame duration, causing latency. A long rendering time may result when a scene with lots of objects or complex lighting is being rendered, as examples. FIG. 11 is a diagram showing how frames may be displayed if a frame has a long rendering time in a display with fixed presentation time. As shown in FIG. 11, a first frame (F1) may begin rendering at $t_0$. F1 may be rendered based upon the predicted head position at $t_1$. At $t_1$, rendering of F1 may finish and F1 may be displayed. Also at $t_1$, rendering of a second frame (F2) may begin. F2 may be rendered based on the predicted head position at $t_2$ (or, in some embodiments, $t_3$). However, F2 may have a long rendering time. At $t_2$, it may be determined that rendering of F2 is incomplete. Therefore, F1 may be displayed again for the standard frame duration from $t_2$ to $t_4$. Consequently, F2 may not be displayed until $t_4$. There is a delay 66 between the time F2 was supposed to be displayed ($t_2$) and when F2 was actually displayed ($t_4$). This latency may result in a compromised experience for the user.

Additionally, when method 82 in FIG. 11 is used, the latency will continue through additional frames. A third frame (F3) may begin rendering when rendering of F2 is complete at $t_3$. F3 may be rendered based on the predicted head position at $t_5$, as an example. However, F3 may not actually be displayed until $t_6$. Therefore, there is a delay 70 between the time F3 is expected to display ($t_5$) and the time F3 actually displays ($t_6$). In some situations, F3 may be rendered based on the predicted head position at $t_6$ to avoid latency. However, there will still be an undesirable delay between the time F3 finishes rendering ($t_5$) and the time F3 is displayed ($t_6$).

FIG. 12 is a diagram showing a method of reducing latency when a frame has an extended rendering period. As shown in FIG. 12, a first frame (F1) may begin rendering at $t_0$. F1 may be rendered based upon the predicted head position at $t_1$. At $t_1$, rendering of F1 may finish and F1 may be displayed. Also at $t_1$, rendering of a second frame (F2) may begin. F2 may be rendered based on the predicted head position at $t_2$. However, F2 may have a long rendering time. At $t_2$, it may be determined that rendering of F2 is incomplete. Instead of displaying F1 again for the standard frame duration (as in FIG. 11), the frame duration of F1 may be extended (by time period 68) until rendering of F2 is complete. At $t_3$, when F2 has finished rendering, F2 may be displayed. The extended rendering period of F2 may cause some latency (i.e., delay 68 between expected display time of F2 ($t_2$) and actual display time of F2 ($t_3$)). However, the latency is reduced compared to latency 66 of FIG. 11. Additionally, the subsequent frames will have less latency when following method 84 in FIG. 12 compared to method 82 of FIG. 11. At $t_3$, when rendering of F2 is complete, rendering of a third frame (F3) may begin. F3 may be rendered based on the predicted head position at $t_4$. At $t_4$, F3 may be displayed (with no delay between the end of the rendering period and the actual display time).

In method 84, F1 may be displayed until rendering of F2 is complete. It should be noted, however, that continuously displaying F1 for too long of a time period may not be desirable. Accordingly, at $t_2$, the expected render completion time for F2 may be determined. If the expected render completion time is longer than a time threshold, F1 may be displayed again similar to as described in connection with method 82 in FIG. 11. For example, the threshold may be approximately 2 ms. In this example, F1 will be extended for as long as 2 ms to wait for F2 to finish rendering. However, if F1 needs to be extended for more than 2 ms, F1 will be displayed again for the standard duration of time. The threshold for determining whether or not to extend F1 may be a fixed threshold or a variable threshold. The threshold may be any desired length of time (e.g., less than 2 ms, between 1 and 3 ms, less than 5 ms, less than 3 ms, greater than 1 ms, etc.).

To further reduce latency, in some situations it may be determined in advance that a frame will have a long rendering period and the head position may be predicted accordingly. Consider F2 of FIG. 12 as an example. At $t_1$, it may be determined that F2 will have a longer rendering time than usual, and that F2 will likely not finish rendering until $t_3$. F2 may then be rendered based on the predicted head position at $t_3$ (instead of the predicted head position at $t_2$ as described previously). In general, each frame may be rendered based on the head position at that time or the predicted head position for any desired time.

The concept of time warping described in connection with FIG. 5 may also be applied to the methods shown in FIGS. 10-12. In general, each frame may be rendered based on a predicted head position for the predicted display time. However, sensor data at the actual display time may indicate that the actual head position does not match the predicted head position. The frame may be shifted to help account for the difference between the predicted head position and the actual head position. This method may be applied to any frame that is displayed.

Figure 13:
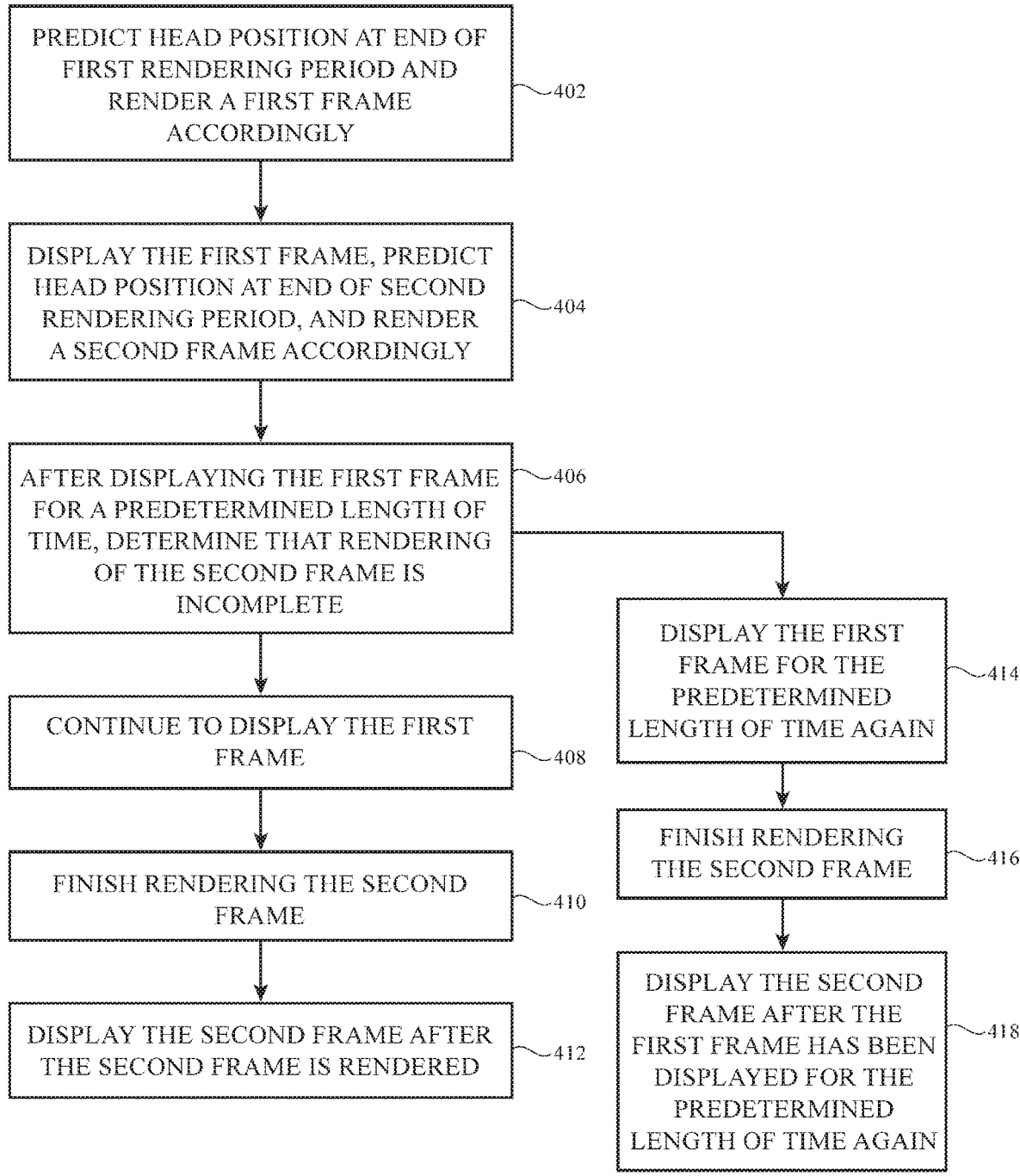
FIG. 13 is a flowchart of illustrative method steps for rendering and displaying image frames with an arbitrary presentation time in a display that uses head position prediction when an image frame has a long rendering period in accordance with an embodiment.

FIG. 13 shows illustrative method steps for using arbitrary presentation time in a display with predictive rendering. At step 402, a GPU (e.g., GPU 44) may begin rendering a first frame based on a predicted head position at the end of the first rendering period. Next, at step 404, the first frame may be displayed. Also at step 404, the GPU may begin rendering a second frame based on a predicted head position at the end of the second rendering period. At step 406, the display may finish displaying the first frame for the predetermined length of time (i.e., the standard frame duration). Also at step 406, it may be determined that the second frame is not done rendering.

In response to determining that the second frame is not done rendering, the expected time remaining in the rendering process may be determined. If the time remaining is less than a threshold, the method may proceed to step 408. If the time remaining is greater than the threshold, the method may proceed to step 414 and display the first frame for the predetermined length of time again (similar to as discussed in connection with FIG. 7). At step 416, the GPU may finish rendering the second frame. However, there may be a delay until the second frame is displayed at step 418. The second frame may not be displayed at step 418 until after the first frame has been displayed for the predetermined length of time again. If the time remaining in the rendering process is less than the threshold and the method proceeds to step 408, the first frame may continue to be displayed until the second frame is done rendering. The second frame may then finish rendering at step 410. At step 412, immediately after the second frame is done rendering, the second frame may be displayed. This method may reduce latency in the display.

In addition to latency, power consumption and display lifespan are other issues faced by displays in head-mounted devices. In general, decreasing power consumption in head-mounted devices for increased battery life is desirable. One cause of increased power consumption and decreased display lifespan in head-mounted displays is increased pixel brightness to account for low persistence. Persistence may refer to the length of time light is emitted during a frame. Frames may have a typical frame duration, and light may only be emitted for a fraction of the frame duration. Persistence may be controlled to reduce blur for a user. The longer the persistence, the more blur in the image a user may detect. Blur may also increase as the resolution of the display increases. Therefore, in order to avoid motion blur in the display, the persistence may be decreased. However, to maintain desired pixel brightness as the persistence is decreased, the pixel intensity has to be increased. Increasing the pixel intensity requires drawing more current through the light-emitting diodes in the display, which may decrease the lifespan of the display.

In order to maximize the lifespan of the display, therefore, it is desirable to use as high a persistence as possible. A number of factors may influence the persistence required for a particular pixel. For example, the head motion of the user may be proportional to motion blur in the display. Therefore, as the head motion of the user increases, the persistence may decrease to reduce motion blur. When there is little to no head motion, the display may use a higher persistence with lower pixel intensity. When there is more significant head motion, the display may use lower persistence with higher pixel intensity. However, in both cases the perceived brightness of the pixel to the user is the same. Gaze tracking may also be used to influence the length of persistence periods. Gaze tracking image sensors may be used to determine where the user is looking on the display. The center of the user's gaze will be more susceptible to blur than the periphery of the user's gaze. Therefore, pixels in the center of the user's gaze may have a lower persistence period while pixels in the periphery of the user's gaze may have a higher persistence period. Persistence may also be varied based on the location of the pixel in the display. In a head-mounted display, the center of the display may have a higher resolution than the periphery of the display. Because, resolution of the display is proportional to perceived motion blur, the persistence can depend on the location of the pixel within the display. For example, a pixel in the center of the display (in a high resolution region) may have a lower persistence whereas a pixel in the periphery of the display (in a low resolution region) may have a higher persistence.

Figure 14:
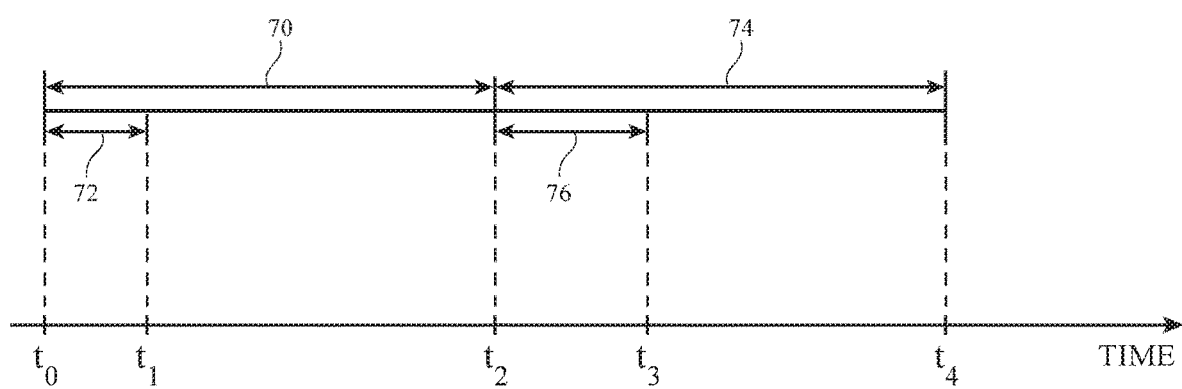
FIG. 14 is a timing diagram showing illustrative image frames with different persistence periods in accordance with an embodiment.

FIG. 14 shows how a display may have variable persistence. A first frame may have a duration 70 between $t_0$ and $t_2$. However, light may not be emitted throughout the entire frame. Light may be emitted during persistence period 72 between $t_0$ and $t_1$. Persistence time 72 may be determined at $t_0$ based on the factors described above. Sensor data such as accelerometer data and gaze detection data may help determine the persistence time. The location of the pixel within the array may also help determine the persistence time. As shown, the persistence time for a subsequent frame may be different than the persistence time for the first frame. A second frame may have a duration 74 between $t_2$ and $t_4$. However, light may not be emitted throughout the entire frame. Light may be emitted only during persistence time 76 between $t_2$ and $t_3$. Persistence time 76 may be longer than persistence time 72 (as shown in FIG. 14). Alternatively, persistence time 76 may be shorter than persistence time 72 or persistence times 72 and 76 may be the same. Persistence times 72 and 76 may be any desired time durations (i.e., less than 10 ms, greater than 10 ms, less than 2 ms, between 0 and 3 ms, etc.). Frame durations 70 and 74 may be any desired time durations (i.e., around 8 ms, around 16 ms, between 5 and 20 ms, less than 20 ms, greater than 10 ms, etc.).

Figure 15:
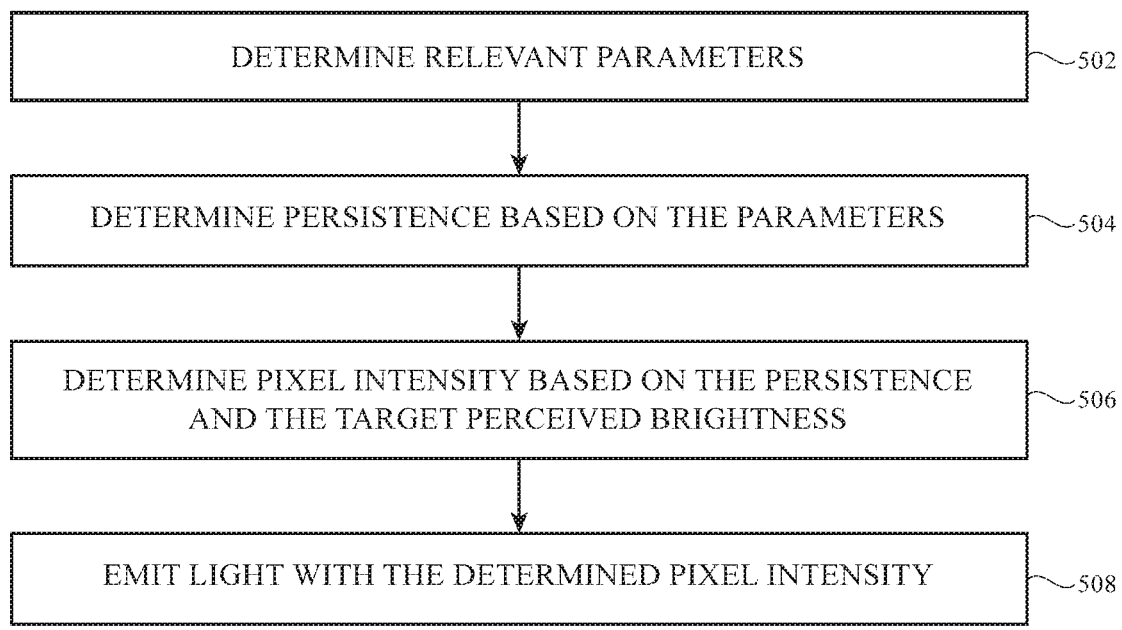
FIG. 15 is a flowchart of illustrative method steps for determining the persistence and pixel intensity for an image pixel in accordance with an embodiment.

FIG. 15 shows illustrative method steps for operating a display with variable persistence. This method may be performed to determine the persistence for a frame of image data for a particular pixel, for example. At step 502, various parameters relevant to persistence may be determined. For example, accelerometer data and other sensor data may be used to determine the head motion of the user. Additionally, gaze detection data may be used to determine the gaze direction of the user. The location of the pixel may also be factored into the persistence determination. In general, any desired parameters may be used to help determine persistence. At step 504, the persistence may be determined based on the parameters. In general, the highest possible persistence may be used while ensuring little to no motion blur for the user. Based on the persistence and a target perceived brightness for the pixel, the pixel intensity may be determined at step 506. Finally, at step 508 the pixel may emit light at the determined intensity.

The target perceived brightness and determined pixel intensity may ultimately be used to have the pixel emit light in a number of different ways. In one example, maximum perceived brightness may map to the highest available digital value for the shortest allowable persistence. In one illustrative example, 255 may correspond to a persistence of 2 ms. However, if the persistence is 4 ms, the maximum brightness would correspond to 127. This allows for the digital value for pixel intensity to be easily modified based on the determined persistence. However, this method may reduce the dynamic range of the display, particularly at longer persistence values. Instead, the digital value may encode the desired target perceived brightness (without any influence from persistence). The display driver circuitry would then use the target perceived brightness and persistence to determine what analog voltage to provide to each pixel. Additionally, the center of the emission window (i.e., the persistence) may match the time used for head position prediction in frame rendering. This means that when rendering a frame based on predicted head position, the predicted head position should be the head position predicted for the time that is in the middle of the persistence time period.

There are a number of other ways to conserve battery life within a head-mounted display. One way to reduce power consumption is to vary the refresh rate of the display. In general, higher refresh rates will require more power consumption. In certain applications, using a high refresh rate is necessary to optimize performance of the display. However, in some circumstances the refresh rate may be reduced without affecting the user's experience. One example is if the head-mounted display is displaying data from a content source (i.e., a video) that is not dependent on the user's head position. In these scenarios, a refresh rate of, for example, 60 Hz may be sufficient. If the user is instead using the head-mounted display for an application that necessitates the display responding to head position, a refresh rate of, for example, 120 Hz may be appropriate. If the content on the head-mounted display is dependent on the head position of the user, there may still be opportunities to lower the refresh rate. For example, if the user's head is very still with minimal movement, a high refresh rate may not be required (i.e., the user may not be able to distinguish between 60 Hz and 120 Hz refresh rate). If the user's head is moving very fast, the user may also not be able to distinguish between 120 Hz and 60 Hz refresh rates. Gaze detection data may also be used to vary refresh rate in a display. When a user's gaze is moving, the user may not be able to distinguish between high and low refresh rates (regardless of head movement). Therefore, low refresh rates may be used during gaze movement to conserve power.

Figure 16:
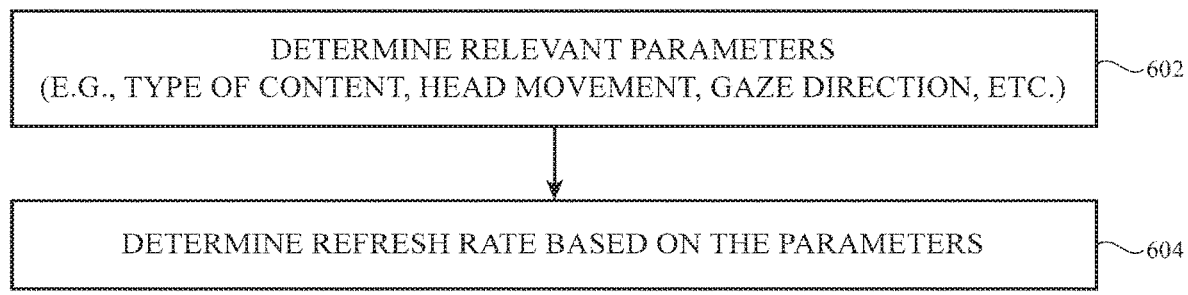
FIG. 16 is a flowchart of illustrative method steps for determining the refresh rate of a portion of a display in accordance with an embodiment.

FIG. 16 shows illustrative method steps for determining refresh rate in a display. At step 602, various parameters relevant to refresh rate may be determined. For example, accelerometer data and other sensor data may be used to determine the head motion and position of the user. Additionally, gaze detection data may be used to determine the gaze direction and gaze movement of the user. The type of content being displayed may also be factored into the refresh rate determination. In general, any desired parameters may be used to help determine refresh rate. Then at step 604, the display may determine refresh rate based on the parameters. Refresh rate may be determined individually for each pixel, may be determined on a row-by-row basis, may be determined on a region-by-region basis, or may be determined in any other desired manner.

In various embodiments, a method of operating a display in a head-mounted device may include rendering a first image frame, displaying the first image frame for a predetermined length of time after rendering the first image frame, rendering a second image frame after rendering the first image frame, determining that the second image frame has not finished rendering after displaying the first image frame for the predetermined length of time, and extending the predetermined length of time of the first image frame until the second image frame has finished rendering in response to determining that the second image frame has not finished rendering.

The method may also include determining a length of time until the second image frame will be finished rendering in response to determining that the second image frame has not finished rendering. Extending the predetermined length of time of the first image frame until the second image frame has finished rendering may include extending the predetermined length of time of the first image frame until the second image frame has finished rendering in response to determining that the length of time until the second image frame will be finished rendering is less than a threshold. The threshold may be a fixed threshold or a variable threshold. The predetermined length of time may be between 5 and 20 milliseconds, and the threshold may be less than 3 milliseconds. The method may also include displaying the second image frame after the second image frame has finished rendering. Rendering the first image frame may include rendering the first image frame at a first time, and the first image frame may be rendered based on a head position of a user of the head-mounted device at the first time. Rendering the second image frame may include rendering the second image frame at a second time, and the second image frame may be rendered based on a head position of a user of the head-mounted device at the second time.

In various embodiments, a head-mounted device configured to be worn by a user may include a display and a plurality of sensors. A method of operating the head-mounted device may include displaying a first image frame for a predetermined length of time at a first time, generating a sensor data sample using the plurality of sensors at the first time, predicting a head position of the user at a second time based on the sensor data sample, rendering a second image frame based on the predicted head position of the user at the second time, determining that the second image frame has not finished rendering after the predetermined length of time, and continuing to display the first image frame until the second image frame has finished rendering after determining that the second image frame has not finished rendering. The sensor data sample may be a second sensor data sample. The method may also include generating a first sensor data sample using the plurality of sensors at a third time that is before the first time and predicting a head position of the user at the first time based on the first sensor data sample. The method may also include rendering the first image frame based on the predicted head position of the user at the first time.

In various embodiments, a display in a head-mounted device may include a plurality of pixels and the head-mounted device may include sensors. A method of operating the display may include generating sensor data with the sensors, determining a length of time for a persistence period for at least one pixel in the display based on the sensor data, determining a pixel intensity for the at least one pixel based on the length of time of the persistence period and a target perceived brightness of the at least one pixel, and emitting light for the length of time at the pixel intensity using the at least one pixel. The sensors may include an accelerometer that is configured to determine head motion of a user of the head-mounted device. Determining the length of time for the persistence period for the at least one pixel in the display based on the sensor data may include determining the length of time for the persistence period for the at least one pixel based on the head motion of the user. The sensors may include a gaze detection sensor that is configured to determine a gaze direction of a user. Determining the length of time for the persistence period for the at least one pixel in the display based on the sensor data may include determining the length of time for the persistence period for the at least one pixel based on a position of the at least one pixel relative to the gaze direction of the user.

In accordance with an embodiment, a method of operating a display in an electronic device is provided that includes rendering a first image frame, after rendering the first image frame, displaying the first image frame for a predetermined length of time, after rendering the first image frame, rendering a second image frame, after displaying the first image frame for the predetermined length of time, determining that the second image frame has not finished rendering, and in response to determining that the second image frame has not finished rendering, extending the predetermined length of time of the first image frame until the second image frame has finished rendering.

In accordance with another embodiment, the method includes in response to determining that the second image frame has not finished rendering, determining a length of time until the second image frame will be finished rendering.

In accordance with another embodiment, extending the predetermined length of time of the first image frame until the second image frame has finished rendering includes extending the predetermined length of time of the first image frame until the second image frame has finished rendering in response to determining that the length of time until the second image frame will be finished rendering is less than a threshold.

In accordance with another embodiment, the threshold is a fixed threshold.

In accordance with another embodiment, the threshold is a variable threshold.

In accordance with another embodiment, the method includes after the second image frame has finished rendering, displaying the second image frame.

In accordance with another embodiment, rendering the first image frame includes rendering the first image frame at a first time and the first image frame is rendered based on a head position of a user of the electronic device at the first time.

In accordance with another embodiment, rendering the second image frame includes rendering the second image frame at a second time and the second image frame is rendered based on a head position of a user of the electronic device at the second time.

In accordance with an embodiment, a method of operating a electronic device configured to be worn by a user, the electronic device includes a display and a plurality of sensors, the method is provided that includes at a first time, displaying a first image frame for a predetermined length of time, using the plurality of sensors at the first time, generating a sensor data sample, based on the sensor data sample, predicting a head position of the user at a second time, rendering a second image frame based on the predicted head position of the user at the second time, after the predetermined length of time, determining that the second image frame has not finished rendering, and after determining that the second image frame has not finished rendering, continuing to display the first image frame until the second image frame has finished rendering.

In accordance with another embodiment, the sensor data sample is a second sensor data sample, the method includes using the plurality of sensors at a third time that is before the first time, generating a first sensor data sample, and based on the first sensor data sample, predicting a head position of the user at the first time.

In accordance with another embodiment, the method includes rendering the first image frame based on the predicted head position of the user at the first time.

In accordance with another embodiment, the method includes in response to determining that the second image frame has not finished rendering, determining a length of time until the second image frame will be finished rendering.

In accordance with another embodiment, continuing to display the first image frame until the second image frame has finished rendering includes continuing to display the first image frame until the second image frame has finished rendering in response to determining that the length of time until the second image frame will be finished rendering is less than a threshold.

In accordance with another embodiment, the threshold is a fixed threshold.

In accordance with another embodiment, the threshold is a variable threshold.

In accordance with another embodiment, the predetermined length of time is between 5 and 20 milliseconds.

In accordance with another embodiment, the threshold is less than 3 milliseconds.

In accordance with an embodiment, a method of operating a display in an electronic device, the display includes a plurality of pixels and the electronic device includes sensors, the method provided includes with the sensors, generating sensor data, determining a length of time for a persistence period for at least one pixel in the display based on the sensor data, based on the length of time of the persistence period and a target perceived brightness of the at least one pixel, determining a pixel intensity for the at least one pixel, and using the at least one pixel, emitting light for the length of time at the pixel intensity.

In accordance with another embodiment, the sensors include an accelerometer that is configured to determine head motion of a user of the electronic device and determining the length of time for the persistence period for the at least one pixel in the display based on the sensor data includes determining the length of time for the persistence period for the at least one pixel based on the head motion of the user.

In accordance with another embodiment, the sensors include a gaze detection sensor that is configured to determine a gaze direction of a user and determining the length of time for the persistence period for the at least one pixel in the display based on the sensor data includes determining the length of time for the persistence period for the at least one pixel based on a position of the at least one pixel relative to the gaze direction of the user.

The foregoing is merely illustrative and various modifications can be made by those skilled in the art without departing from the scope and spirit of the described embodiments. The foregoing embodiments may be implemented individually or in any combination.

What is claimed is:

1. A method of operating a display in an electronic device, the method comprising:
    rendering a first image frame;
    after rendering the first image frame, displaying the first image frame for a predetermined length of time;
    after rendering the first image frame, rendering a second image frame;
    after displaying the first image frame for the predetermined length of time, determining that the second image frame has not finished rendering;
    in response to determining that the second image frame has not finished rendering, determining a length of time until the second image frame will be finished rendering;
    comparing the length of time until the second image frame will be finished rendering to a threshold; and
    in response to determining that the length of time until the second image frame will be finished rendering is less than the threshold, extending the predetermined length of time of the first image frame until the second image frame has finished rendering.

2. The method defined in claim 1, wherein the threshold is a fixed threshold.

3. The method defined in claim 1, wherein the threshold is a variable threshold.

4. The method defined in claim 1, further comprising:
    after the second image frame has finished rendering, displaying the second image frame.

5. The method defined in claim 4, wherein rendering the first image frame comprises rendering the first image frame at a first time and wherein the first image frame is rendered based on a head position of a user of the electronic device at the first time.

6. The method defined in claim 5, wherein rendering the second image frame comprises rendering the second image frame at a second time and wherein the second image frame is rendered based on a head position of a user of the electronic device at the second time.

7. A method of operating a display in an electronic device, the method comprising:
    rendering a first image frame;
    after rendering the first image frame, displaying the first image frame for a predetermined length of time;
    after rendering the first image frame, rendering a second image frame starting at a first time based on a first head position at the first time;
    after displaying the first image frame for the predetermined length of time, determining that the second image frame has not finished rendering; and
    in response to determining that the second image frame has not finished rendering, extending the predetermined length of time of the first image frame until the second image frame has finished rendering;
    modifying the second image frame in response to identifying a position change between the first head position at the first time and a second head position at a second time subsequent to the first time; and
    after the second image frame has finished rendering, displaying the second image frame.

* * * * *